June 3, 1969  D. G. LLOYD ET AL  3,447,365
APPARATUS FOR DETERMINING MODULAR PROPERTIES OF
AN ELASTOMER AND NON-DESTRUCTIVE TEST METHOD
Filed March 6, 1967

INVENTORS
DEWI GERWYN LLOYD,
JOHN PAYNE

BY *Richard O. Zerbe*
AGENT

United States Patent Office 3,447,365
Patented June 3, 1969

3,447,365
APPARATUS FOR DETERMINING MODULAR PROPERTIES OF AN ELASTOMER AND NON-DESTRUCTIVE TEST METHOD
Dewi Gerwyn Lloyd, Wrexham, Wales, and John Payne, Oswestry, England, assignors to Monsanto Chemicals Limited, London, England, a British company
Filed Mar. 6, 1967, Ser. No. 620,965
Claims priority, application Great Britain, Mar. 7, 1966, 9,795/66
Int. Cl. G01n *3/24*
U.S. Cl. 73—101
12 Claims

ABSTRACT OF THE DISCLOSURE

An apparatus and method for determining modular properties of an elastomer. The apparatus comprises a member having projections therefrom which penetrate the surface of the elastomer, which member is provided with means for effecting a relative angular displacement between the member and other parts of the elastomer and is surrounded by a housing also containing projections therefrom which penetrate the surface of the elastomer at a distance from the member while permitting angular displacement thereof. Either the torque required to effect displacement of the member is measured or a known torque is applied and the displacement is measured.

---

Figure 1:
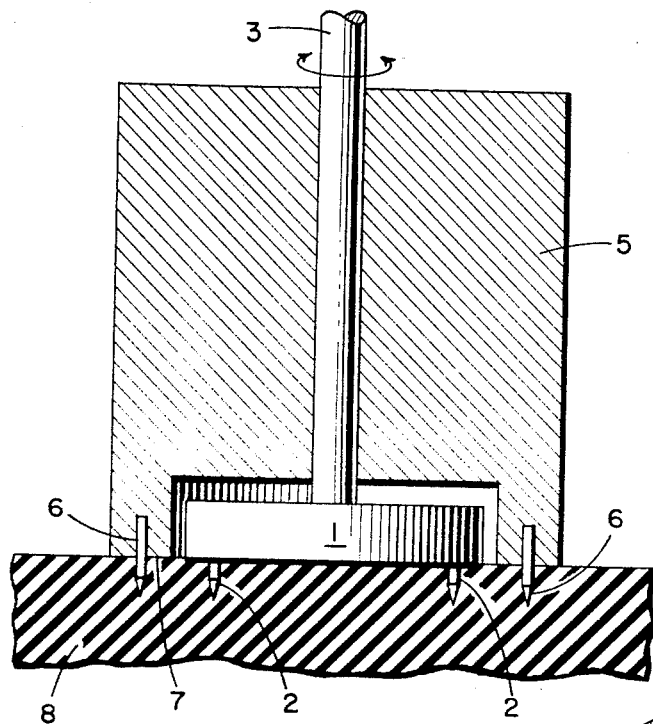

This invention relates to an apparatus and method for the measurement of the modular properties of elastomeric materials.

The usual method for determining the modular properties of articles made in elastomeric materials, for example vehicle tires, shock absorbers, or dampers, involves cutting out test pieces of suitable size and shape for examination on conventional physical-testing machinery from representative members of a batch of the articles. This method is wasteful, since the members so selected are effectively destroyed. A non-destructive test method is, therefore, clearly desirable, and the apparatus of the present invention makes possible such a method.

The apparatus is one for the measurement of the modular properties of an elastomer, which comprises a member adapted for fixed contact with a surface of a sample of the elastomer, means for effecting a relative angular displacement between the member and other parts of the sample such that the sample is subjected to angular shear, means for measuring the torque required to effect the displacement, and means for measuring the displacement.

The method of the invention is one for determining the modular properties of an elastomer which comprises applying a measured torque to a surface of a sample of the elastomer such that the elastomer is subjected to angular shear and measuring the strain induced in the sample of elastomer.

The arrangement of the apparatus is usually such that the torque required to effect displacement is applied about an axis substantially perpendicular to the surface of elastomer in contact with the member, and in the usual form of apparatus the torque is applied through the member rather than through the sample of elastomer.

The member is suitably rotatably mounted, usually coaxially, in a housing which generally surrounds the member and which is adapted to make fixed contact with the surface of the elastomer, usually in substantially the same plane as the member, at some radial distance from the periphery of the member.

Pressure can be used to effect or assist fixed contact between the member and the elastomer surface. The member can conveniently be a disk or bar carrying projections or a series of ridges on the surface that engage the elastomer, mounted at the end of a spindle. The projections may be pins that penetrate a short distance into the surface of the elastomer. Alternatively, the member can be a cylinder having a circular face adapted for engagement with the surface of the elastomer, for example in the manner described above for a disk or bar. Similar projections or ridges can be provided for effecting fixed contact between the elastomer and a housing where one is provided, or alternatively or additionally fixed contact can be achieved or assisted by reducing the pressure within the housing.

In the usual form of construction of the apparatus, the torque is transmitted to the member through a lever or torque arm. Where a measurement of static modulus is required, the applied torque is usually such as to produce a simple angular displacement of the member and the contiguous surface of the elastomer not exceeding 10°. In this case, a spring balance attached to the member can be used to measure the torque, and the angular deflection can be indicated directly by a pointer carried by the member against a fixed scale.

For the measurement of dynamic modulus, an oscillatory motion, usually one having an amplitude of up to 5°, is transmitted to the member. This is conveniently arranged by connecting the lever to an eccentric, driven, for example, by an electric motor. A preferred manner of indicating torque where the device is to be used for the measurement of dynamic modulus is by means of strain gauges bonded to the lever which are responsive to slight distortions of the lever, while a differential transformer is conveniently used for measuring the oscillatory displacement of the member. The strain gauges can be calibrated by dead weight loading. The sinusoidal signals from the strain gauges and differential transformer are preferably amplified and then fed to appropriate presentation devices, for example a meter, oscilloscope, or recorder. If desired, the signals can be separated into components related to the complex, elastic, and viscous moduli of the sample of elastomer under test, for example in the manner described more fully in British Patent No. 1,036,904.

The device can be used to measure the moduli of any natural or artificial elastomer. The elastomers may be vulcanized or cured in any way provided only that they remain elastic.

Figure 2:
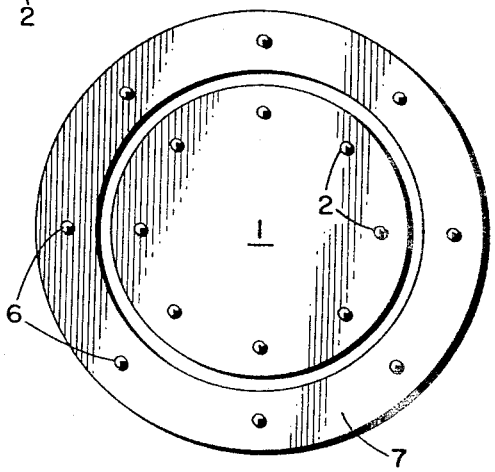
Figure 3:
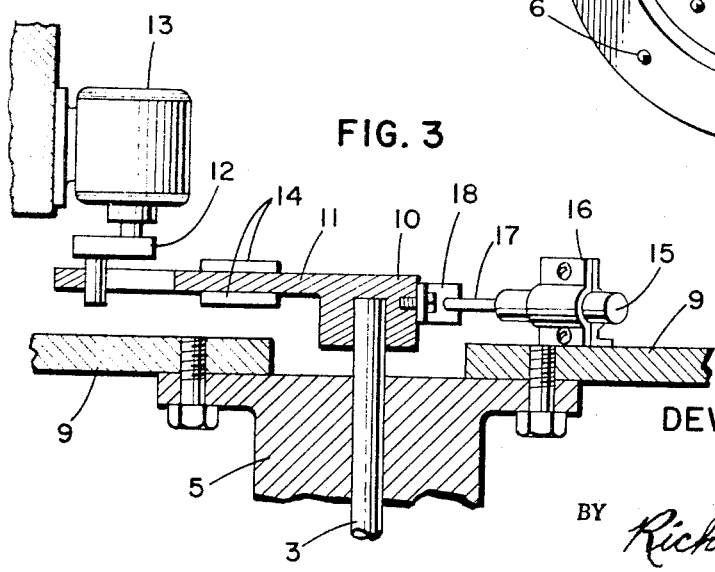

The invention is illustrated by the apparatus shown in the accompanying drawings, in which FIG. 1 is a sectional elevation of a device according to the invention, FIG. 2 is a view of the same device from the underside, and FIG. 3 illustrates a construction by means of which torque can be applied to a member such as that shown in FIG. 2 and the torque and the displacement can be measured.

The contact member 1 is a disk $9/16$ inch in diameter having eight No. 9 needles 2 set at uniform intervals over a half-inch diameter circle on the underside of the disk, each needle projecting 0.1 inch. The disk is attached to the end of a spindle 3.

The contact member is accommodated in a circular recess 4 in the lower part of a cylindrical housing 5 having an axial bore within which the spindle 3 is free to rotate. A second series of eight No. 9 needles 6 is arranged at uniform intervals in a circle round the annular lower face 7 of the housing.

When in use, the device is pressed into contact with the elastomer 8, the modular properties of which are to be measured, with maximum penetration of both sets of needles into the elastomer surface.

In FIG. 3, the upper part of the housing 5 is shown secured to parts of a framework 9. The upper end of the spindle is locked in the bossed end 10 of a lever 11 which is connected near its outer end to an eccentric 12 driven by a variable speed motor 13. Strain gauges 14 are bonded to the lever 11. The cylinder 15 of a differential transformer is held by brackets 16 which in turn are mounted on the framework part 9. The core 17 of the differential transformer has a pivoted connection at its outer end to a bracket 18 fixed to the boss 10.

It will be appreciated that if only the complex dynamic moduli are required, they can be determined by simply measuring the torque required to effect displacement of the member in fixed contact with the elastomer surface. In such case, the differential transformer is unnecessary. For determining dynamic moduli, frequencies up to 3600 cycles per minute comprise the range of usual interest, but this is not to be taken as limitative. As an example of operation to measure dynamic properties, the disk is oscillated over about 2° arc at a frequency of 842 cycles per minute.

It will be further appreciated that instead of applying a measured strain, one may apply a measured torque and determine the resulting strain. The actual strain applied to the rubber by the relatively constant amplitude of the eccentric drive means will vary depending upon the strain loss of the system and will, therefore, to some extent be a function of the modulus.

The apparatus may be designed as either a simple portable model or as a more elaborate stationary model. The rubber sample 8 may be held immobile by suitable means not shown or the housing member 5 may counter the thrust of the applied torque, in which case means are applied for maintaining the housing member immobile. In FIG. 3 the motor 13 and framework 9 may be mounted on a common frame.

It is intended to cover all changes and modifications of the examples of the invention herein chosen for purposes of disclosure which do not constitute departures from the spirit and scope of the invention.

What is claimed is:
1. Apparatus for measuring the modular properties of an elastomer which comprises a torque member rotatably mounted in a housing member generally surrounding the torque member, the torque member and the housing member being adapted for fixed contact with different portions of the surface of the elastomer in substantially the same plane, means for effecting a relative rotary oscillatory displacement between the torque member and the housing member, such that the elastomer is subjected to angular shear, and means for measuring the torque required to effect the displacement.

2. Apparatus according to claim 1 which includes means for measuring the displacement.

3. Apparatus according to claim 2 in which angular displacement is measured by a differential transformer.

4. Apparatus according to claim 1 in which the torque member comprises a disk mounted at the end of a spindle.

5. Apparatus according to claim 4 in which the disk is accommodated in a circular recess in the lower part of a housing having an axial bore within which the spindle is free to rotate, the housing being adapted to make fixed contact with the surface of the elastomer at some radial distance from the periphery of the disk.

6. Apparatus according to claim 5 in which the torque member is provided with a torque arm and the torque is measured by means of strain gauges bonded to the torque arm.

7. Apparatus according to claim 5 in which the means for effecting the displacement are means for applying a torque to the member about an axis substantially perpendicular to the surface of the elastomer in contact with the member.

8. Apparatus according to claim 5 in which the disk has needles projecting perpendicular therefrom and the surface of the housing is provided with perpendicular projecting needles to make a fixed contact with the surface of the elastomer and in which the means for effecting the displacement are means for applying a torque to the member about an axis substantially perpendicular to the surface of the elastomer in contact with the member.

9. Apparatus according to claim 8 which includes a differential transformer for measuring displacement.

10. Apparatus for measuring the modular properties of an elastomer which comprises a torque member rotatably mounted in a housing member generally surrounding the torque member, and adapted to make fixed contact with the surface of the elastomer at some radial distance from the periphery of the torque member, the torque member and the housing member being adapted for fixed contact with different portions of the surface of the elastomer in substantially the same plane, means for applying a measured torque to effect a relative rotary oscillatory displacement between the torque member and the housing member such that the elastomer is subjected to angular shear and means for measuring the angular displacement.

11. A method for determining the modular properties of an elastomer, which comprises applying a measured torque to a portion of a surface of an elastomer to effect rotary oscillatory displacement between said portion and other portion of the same surface and measuring the strain induced thereby.

12. A method for determining the modular properties of an elastomer which comprises applying a measured strain of relative rotary oscillatory displacement between a portion of a surface of an elastomer and other portions of the same surface and measuring the torque required to induce the measured strain.

References Cited
UNITED STATES PATENTS

| | | | |
|---|---|---|---|
| 1,327,838 | 1/1920 | Naylor | 73—15.6 |
| 2,752,778 | 7/1956 | Roberts et al. | 73—60 |
| 2,993,367 | 7/1961 | Flescher et al. | 73—101 |
| 3,182,494 | 5/1965 | Beatty et al. | 73—15.6 X |
| 3,329,010 | 7/1967 | Fryfogle et al. | 73—101 X |
| 3,364,734 | 1/1968 | Wilson | 73—101 |

JAMES J. GILL, Primary Examiner.

JERRY W. MYRACLE, Assistant Examiner.

U.S. Cl. X.R.

73—99